Feb. 28, 1933.                R. E. KUSSEROW                1,899,160
                          PROCESS OF MALTING GRAIN
                            Filed May 12, 1931

INVENTOR.
Reinhold E. Kusserow
BY
Harry C. Schroeder
ATTORNEYS.

Patented Feb. 28, 1933

1,899,160

UNITED STATES PATENT OFFICE

REINHOLD E. KUSSEROW, OF OAKLAND, CALIFORNIA

PROCESS OF MALTING GRAIN

Application filed May 12, 1931. Serial No. 536,794.

This invention is a process of malting grain and refers to a process of malting in which the grain is kept fresh and sweet during the process, preventing souring and moulding of the grain and losses thereby which are very prevalent by the usual processes.

The malt resulting from my process is cleaner, better and more thoroughly sprouted and of higher diastasic power than that produced in the same length of time by the old processes. Corn, rye or wheat malt can be as readily made by my process as can barley malt. The present drum and box-malt processes cannot be used for corn, rye or wheat, due to high temperatures developed, fermentation and sliming which occurs usually after the second day thereby ruining the batch. My process enables the malting of substantially any grain, as the grain can be kept clean and sweet for an almost unlimited time.

The entire process of washing, soaking and germinating are carried on in a single tank and no transfer of the grain is made at any time during the process.

The objects of the invention are

*First*.—To provide a process by which substantially any kind of grain may be malted, and which prevents souring and sliming of the grain during the process.

*Second*.—To provide such a process which may be carried to completion without transfer of the grain, the entire process being carried through in a single tank.

*Third*.—To provide a process as outlined which produces a cleaner malt of higher diastasic power and healthier sprout than the old methods.

*Fourth*.—To provide such a process in which all fermentation, souring, sliming, overheating or chilling of the grain may be obviated and in which the highest percentage of sprouting is obtained.

The process is preferably carried out in a tank similar to that shown in the drawing, but is adaptable to continuous malting processes where a very high production is desired. The equipment indicated in the drawing is the subject of a separate application for patent filed May 12, 1931, Serial No. 536,793, and is adequately illustrated to indicate the means for carrying the process to completion, similar reference characters being used to indicate similar parts throughout the several views, in which.

Figure 1:
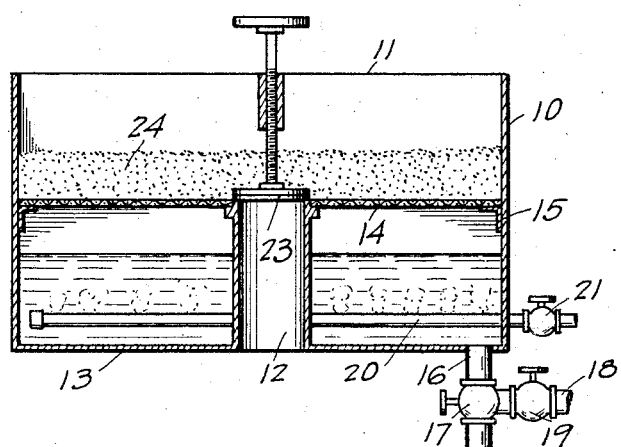
Fig. 1 is a sectional elevation through the installation used in carrying out my process.
Figure 2:
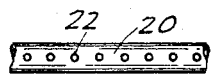
Fig. 2 is a fragmentary view of the compressed air distributor pipe.

The equipment used in carrying out the process consists of a tank 10 having an open top 11 and a central chute 12 extending upwardly from the bottom 13. An intermediate floor 14 made of screen, perforated or slit metal plate, is removably supported on brackets 15 or by other known means, and also supported intermediately as may be required.

A water inlet pipe 16 is controlled by a valve 17, and communicates with the bottom of the tank. A second pipe 18 communicates with the tank bottom and has a valve 19 for draining water from the tank or to permit escape of carbon dioxide. A plurality of air pipes 20 are controlled by valves 21 and are provided with a multiplicity of small holes 22 through which the compressed air escapes for aeration of the grain, or through which a vacuum is produced for drawing air downwardly through the grain.

A suitable closure 23 is provided for closing the chute 12.

The process is carried out in the following manner. A bed of grain 24 is uniformly distributed over the intermediate floor 14, the closure 23 being clamped down on the top of chute 12 as indicated. Floor 14 is made of screen, perforated metal plate or metal bars, having openings to permit water and air to pass through but preventing the grain from passing through or clogging.

Valves 19 and 21 are closed and valve 17, controlling the water supply is opened, permitting the water to fully cover the grain 24. Alkali or acid, such as lime, sodium carbonate, sodium silicate, hydrochloricacid or other chemical compounds are added to the water as required to remove or weaken deleterious micro-organisms from the grain without damage to the grain or germ growth.

The grain is permitted to soak in this water for from ten minutes to two hours depending on the condition and kind of grain while compressed air is admitted through the pipes 20 and discharged through the water and passes upwardly through the bed of grain 24. The water is then drained out through pipe 18, which opens to the atmosphere. This pipe is left open between washing and soaking cycles to permit the escape of any carbon dioxide formed.

The washing and soaking is repeated periodically during twelve to forty eight hours, after which the tank is partly filled with water as indicated in the drawing and compressed air blown therethrough, the moistened air passing through the bed of grain in just sufficient volume to maintain the correct germinating temperature for the grain and which can be regulated to precision thereby. At intervals the direction of the flow of air is reversed for soaking, by vacuum means connected to the pipes.

The carbon dioxide which is detrimental to the germinating grain may be removed by gravity, by compressed air flowing upwardly through the bed, or by vacuum produced below the bed according to requirements and conditions.

Following completed germination of the grain, the malt is discharged through the chute 12, the intermediate floor or screen 14 is removed and the tank and screen are thoroughly cleaned.

It will be noted that by my process a very simple installation is required which necessitates but little attention; the malt is cleaner, high efficiency in germination; increased diastasic power; saves time, space and labor; permits malting of substantially any variety of grain and provides a higher yield in the extraction of the malt.

It will also be noted that variations in the process which are consistent with the appended claims may be resorted to without detracting from the spirit or scope of the invention or sacrificing any of the advantages thereof.

I claim:—

1. The process of malting without transfer of grain which consists in agitating and soaking grain in water for repeated comparatively short periods, draining the water therefrom after each soaking, and germinating the grain in the presence of a continuous variable stream of air passing therethrough.

2. The process of malting consisting of a soaking and washing period and a germination period, said soaking and washing period consisting of soaking said grain for comparatively short periods at intervals while passing compressed air therethrough, said germinating period continuing to completion with a supply of moistened air under pressure passing upwardly through the bed of grain and alternating with air passing downwardly therethrough.

3. The process of malting which consists in suspending the grain in water and passing air upwardly therethrough for periods of from ten minutes to two hours, and repeated at intervals for twelve to forty eight hours, draining the water therefrom after each cycle, and continuing the germination of the grain and controlling the temperature thereof by passing moistened or dry air through the bed of grain continuously in required volume.

4. The process of malting which consists in bedding grain on a pervious floor intermediately disposed within a tank, soaking and agitating said grain by means of compressed air and water and draining the water therefrom at predetermined intervals during a period of twelve to forty eight hours, then passing saturated air upwardly and alternating with dry air downwardly through said bed in requisite volume to maintain the correct temperature for efficient germination during the entire germination period of said grain.

5. The process of malting which consists in bedding grain on a pervious floor intermediately disposed within a tank, filling said tank to flood the grain, passing compressed air upwardly through said grain and said water for periods of ten minutes to two hours, draining the water therefrom and repeating the operation at intervals over a period of twelve to forty eight hours, then filling said tank to adjacent said floor with water, passing compressed air through said water and thence through said grain in requisite volume to maintain correct temperature for efficient germination during the entire germination period of said grain.

In testimony whereof I have affixed my signature.

REINHOLD E. KUSSEROW.